United States Patent
Oilar et al.

(10) Patent No.: US 8,307,801 B2
(45) Date of Patent: Nov. 13, 2012

(54) COMBINATION TO SUPPORT AND ROTATABLY DRIVE MASS

(75) Inventors: Sean Patrick Oilar, Wolcott, IN (US); Allyn P. Bock, Peachtree City, GA (US); John Thomas Allington, Lafayette, IN (US); Stuart Charles Holder, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 1053 days.

(21) Appl. No.: 12/285,218

(22) Filed: Sep. 30, 2008

(65) Prior Publication Data
US 2010/0079018 A1  Apr. 1, 2010

(51) Int. Cl.
*F02B 75/06* (2006.01)

(52) U.S. Cl. .......... 123/192.1; 123/149 D; 403/258; 310/74

(58) Field of Classification Search .......... 123/149 D, 123/192.1; 310/74, 154, 75 R; 464/182; 403/258
See application file for complete search history.

(56) References Cited

U.S. PATENT DOCUMENTS

| | | | |
|---|---|---|---|
| 2,815,974 A | 12/1957 | Stubbe | |
| 2,832,906 A | 4/1958 | Koons | |
| 3,069,915 A | 12/1962 | Sawle, Jr. | |
| 3,570,464 A * | 3/1971 | Morabit et al. | 123/185.2 |
| 3,886,805 A * | 6/1975 | Koderman | 74/52 |
| 4,026,249 A * | 5/1977 | Larrea | 123/245 |
| 4,446,955 A * | 5/1984 | Lech, Jr. | 192/206 |
| 4,846,123 A * | 7/1989 | Bolton, Jr. | 123/192.2 |
| 4,856,639 A * | 8/1989 | Fukushima | 192/55.61 |
| 5,094,202 A * | 3/1992 | Belford | 123/197.4 |
| 5,279,183 A * | 1/1994 | Forster et al. | 403/359.4 |
| 5,799,766 A * | 9/1998 | Link et al. | 192/70.16 |
| 5,816,102 A | 10/1998 | Kern et al. | |
| 5,826,689 A * | 10/1998 | Bochot | 192/70.17 |
| 6,386,981 B1 * | 5/2002 | Birk et al. | 464/68.1 |
| 6,810,849 B1 * | 11/2004 | Hirsch et al. | 123/185.3 |
| 6,869,367 B2 | 3/2005 | Herdin et al. | |
| 2010/0021331 A1 * | 1/2010 | Hruschka | 418/136 |

FOREIGN PATENT DOCUMENTS

| | | |
|---|---|---|
| DE | 10331371 | 1/2005 |
| GB | 705933 | 3/1954 |
| JP | 62 141940 | 6/1987 |
| WO | WO 02/065619 A1 | 8/2002 |

* cited by examiner

*Primary Examiner* — Noah Kamen
*Assistant Examiner* — Long T Tran
(74) *Attorney, Agent, or Firm* — Finnegan, Henderson, Farabow, Garrett & Dunner LLP

(57) ABSTRACT

A combination for use in supporting and rotatably driving a mass is disclosed. The combination may have a power source. The combination may also have a flywheel, which may be configured to connect with and rotatably drive the mass. The flywheel may have a flywheel end, which may have a plurality of flywheel protrusions. Additionally, the combination may have a bearing, which may be situated at least partially within the power source. The bearing may be configured to support and at least partially house the flywheel. In addition, the combination may have a crankshaft, which may be shaped to connect with and rotatably drive the flywheel. The crankshaft may have a crankshaft end, which may have a plurality of crankshaft protrusions. The plurality of crankshaft protrusions may be shaped to mesh with the plurality of flywheel protrusions.

20 Claims, 4 Drawing Sheets

US 8,307,801 B2

COMBINATION TO SUPPORT AND ROTATABLY DRIVE MASS

TECHNICAL FIELD

The present disclosure relates generally to a combination and, more particularly, to combination for use in supporting and rotatably driving a mass.

BACKGROUND

Engines are sometimes used to drive and support masses. For example, an engine can be used to drive a rotor of a single bearing generator. In such a setup, a first side of the rotor is supported by a bearing of the single bearing generator, while a second side of the rotor (opposite the first side of the rotor) is supported by the engine. Specifically, the second side of the rotor is supported by an end of a crankshaft of the engine. Unfortunately, when the crankshaft of the engine drives the rotor, movement of the crankshaft and the rotor causes the end of the crankshaft to orbit and/or vibrate. This orbiting and/or vibrating increases undesirable bending stresses within the crankshaft.

One way to reduce the orbiting and/or vibrating of the end of the crankshaft is to support the end of the crankshaft with a bearing. An example of this strategy is described in G.B. Patent No. 705,933 (the '933 patent) to Hallewell, which was published on Mar. 24, 1954. The '933 patent describes a rotor carried on a bracket, which is bolted directly to a flywheel. The flywheel is bolted to a crankshaft of an engine. Bending movement of the crankshaft is reduced by providing a crankshaft journal bearing placed close up to the flywheel.

Although the crankshaft journal bearing may reduce bending movement of the crankshaft as taught in the '933 patent, the combination of the crankshaft journal bearing and the bolts connecting the crankshaft to the flywheel may limit the crankshaft's ability to transmit to the flywheel large amounts of torque at high rotational speeds. This is because a strength (an ability to transmit torque) of the connection between the crankshaft and the flywheel of the '933 patent is proportional to the number of bolts of the connection. Although the number of bolts could be increased by increasing the diameter of the crankshaft (i.e., by increasing the connection area), the diameter of the crankshaft is limited by the rotational speed of the crankshaft. This is because the surface speed of the crankshaft is limited by the crankshaft journal bearing. Specifically, the surface speed of the crankshaft is limited by the crankshaft journal bearing because excessive surface speed can damage the crankshaft journal bearing. Since the diameter of the crankshaft and the rotational speed of the crankshaft are both proportional to the surface speed of the crankshaft, the diameter of the crankshaft and the rotational speed of the crankshaft are inversely proportional to each other when the surface speed of the crankshaft is held constant. Therefore, large diameters (capable of transmitting large amounts of torque) and high rotational speeds are mutually exclusive. In other words, the combination of the crankshaft journal bearing and the bolts connecting the crankshaft to the flywheel cannot, without damaging the crankshaft journal bearing, transmit to the flywheel some large amounts of torque at some high rotational speeds.

The disclosed combinations are directed to overcoming one or more of the problems set forth above and/or other problems in the art.

SUMMARY

In one aspect, the present disclosure is related to a combination for use in supporting and rotatably driving a mass. The combination may include a power source. The combination may also include a flywheel, which may be configured to connect with and rotatably drive the mass. The flywheel may include a flywheel end, which may include a plurality of flywheel protrusions. Additionally, the combination may include a bearing, which may be situated at least partially within the power source. The bearing may be configured to support and at least partially house the flywheel. In addition, the combination may include a crankshaft, which may be shaped to connect with and rotatably drive the flywheel. The crankshaft may include a crankshaft end, which may include a plurality of crankshaft protrusions. The plurality of crankshaft protrusions may be shaped to mesh with the plurality of flywheel protrusions.

In another aspect, the present disclosure is related to a combination for use in supporting and rotatably driving a rotor of a single bearing generator. The combination may include a power source. The combination may also include a flywheel, which may be configured to connect with and rotatably drive the rotor. The flywheel may include a plurality of flywheel teeth. Additionally, the combination may include a bearing situated at least partially within the power source. The bearing may be configured to support and at least partially house the flywheel. In addition, the combination may include a crankshaft, which may be configured to connect with and rotatably drive the flywheel. The crankshaft may include a plurality of crankshaft teeth. The plurality of crankshaft teeth may be configured to mesh with the plurality of flywheel teeth.

In yet another aspect, the present disclosure may be related to a generator set. The generator set may include a single bearing generator, which may include a rotor. The generator set may also include a power source. Additionally, the generator set may include a flywheel, which may be configured to connect with and rotatably drive the rotor. The flywheel may include a flywheel end. The flywheel may also include a plurality of flywheel teeth, which may protrude from the flywheel end. In addition, the generator set may include a bearing, which may be situated at least partially within the power source. The bearing may be configured to support and at least partially house the flywheel. The generator set may also include a crankshaft, which may be configured to connect with and rotatably drive the flywheel. The crankshaft may include a crankshaft end. Additionally, the crankshaft may include a plurality of crankshaft teeth, which may protrude from the crankshaft end. The plurality of flywheel teeth and the plurality of crankshaft teeth may both be configured such that a curvic-type coupling is formed by meshing the plurality of flywheel teeth with the plurality of crankshaft teeth.

DETAILED DESCRIPTION

Figure 1:
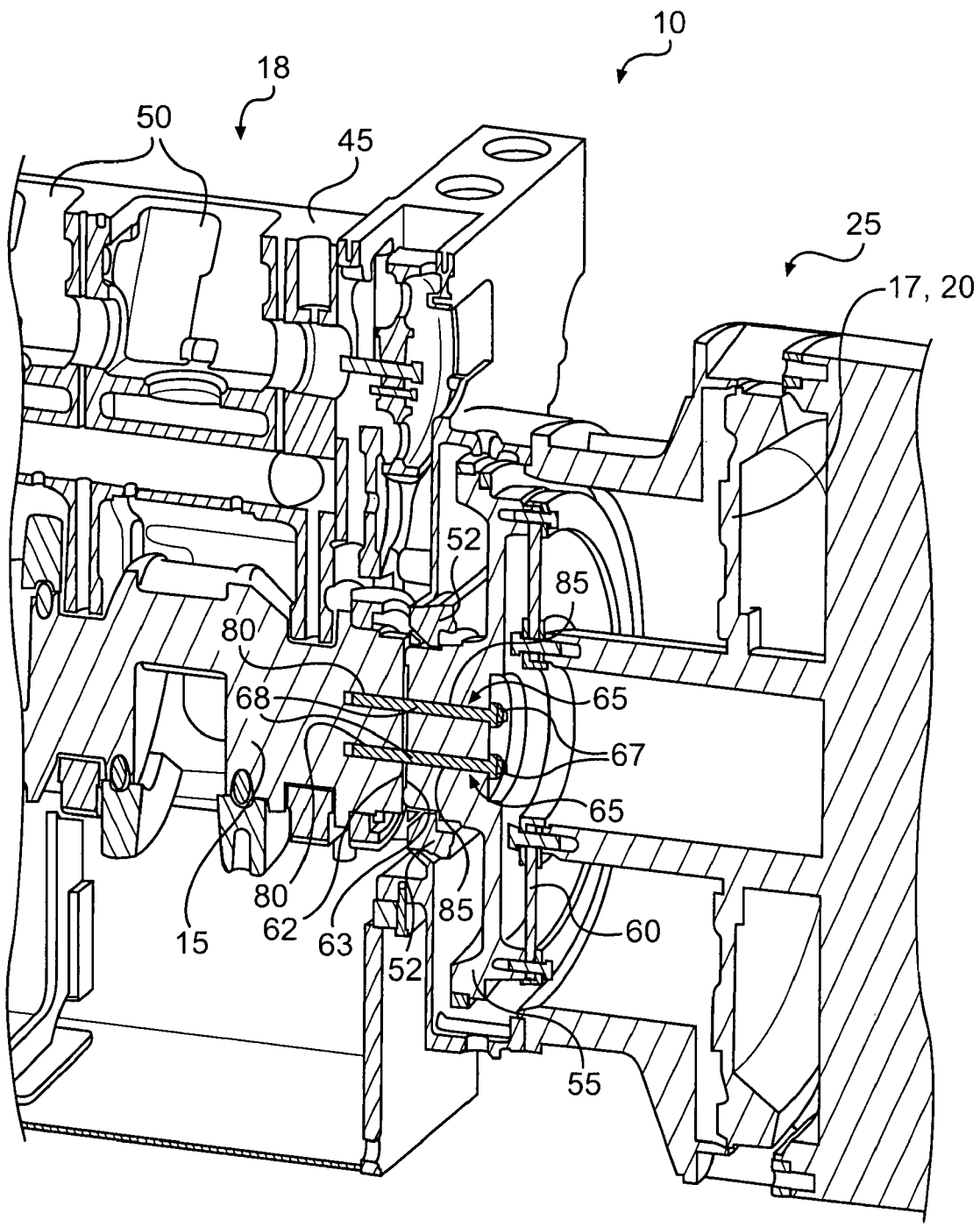
FIG. 1 is a cross-sectional illustration of an exemplary disclosed generator set having an exemplary disclosed crankshaft connected to an exemplary disclosed mass.

FIG. 1 illustrates a generator set 10 having a crankshaft 15 connected to a mass 17. For example, crankshaft 15 may be a crankshaft of a power source 18, and mass 17 may be a rotor 20 of a generator 25. Power source 18 and generator 25 may be coupled such that power source 18 rotatably drives rotor 20 via crankshaft 15, and such that power source 18 supports rotor 20. For example, power source 18 may support rotor 20 when generator 25 fails to adequately support rotor 20. Generator 25 may fail to adequately support rotor 20 when, for example, generator 25 is a single bearing generator, which only supports one side of rotor 20. Although the connection between crankshaft 15 and rotor 20 is described in more detail below, it should be noted that the components and features described herein are equally applicable to connections between crankshaft 15 and other masses 17 such as, for example, fan blades, propellers, or other masses that are rotatably driven by crankshafts 15 and supported by power sources 18.

As illustrated in FIG. 1, power source 18 may include an engine block 45, which may have cylinders 50. Crankshaft 15, which may be situated at least partially within power source 18, may be rotatably driven by pistons (not shown) located within cylinders 50. Alternatively, engine block 45 may not have cylinders 50, and crankshaft 15 may be rotatably driven by other components of power source 18 such as, for example, rotors of a Wankel engine, rotors of an electric motor, or turbines of a jet engine.

Although crankshaft 15 may be directly connected to rotor 20, it is contemplated that generator set 10 may include other components connected between crankshaft 15 and rotor 20. These other components, which may receive support from a bearing 52 situated at least partially within power source 18, may help support crankshaft 15 and/or rotor 20, while allowing crankshaft 15 to transfer torque to and rotatably drive rotor 20. For example, bearing 52 may be a journal bearing, a ball bearing, a magnetic bearing, or another type of bearing known in the art. Bearing 52 may support and at least partially house a flywheel 55, which may be connected between crankshaft 15 and rotor 20. Flywheel 55 may in turn support crankshaft 15 and a flexplate 60, which may be connected between flywheel 55 and rotor 20, and which may support rotor 20. These chains of support may prevent orbiting and/or vibrating of a crankshaft end 62 of crankshaft 15 and a flywheel end 63 of flywheel 55, thereby reducing bending movement of crankshaft 15. However, the chains of support may also limit a diameter of flywheel end 63 if flywheel 55 is to be rotated at high speed. Specifically, bearing 52, which may be damaged by excessive surface speeds of flywheel end 63, may limit the diameter of flywheel end 63. This is because the diameter of flywheel end 63 and the rotational speed of flywheel 55 may both be proportional to the surface speed of flywheel end 63 when the surface speed of flywheel end 63 is held constant. Therefore, the diameter of flywheel end 63 and the rotational speed of flywheel 55 may be inversely proportional to each other. In other words, bearing 52 may be damaged if flywheel end 63 has a large diameter and flywheel 55 is rotated at high speed.

The connection between crankshaft 15 and flywheel 55, and more specifically, the connection between crankshaft end 62 and flywheel end 63, may be configured such that the limit on the diameter of flywheel end 63 does not undesirably limit an amount of torque crankshaft 15 may transmit to rotor 20 via flywheel 55. For example, threaded fasteners 65 may be used to connect crankshaft end 62 to flywheel end 63. Threaded fasteners 65 may maintain in a meshed configuration teeth protruding from each of crankshaft end 62 and flywheel end 63, allowing transmissions of torque via the teeth, as described in further detail below.

Figure 2:
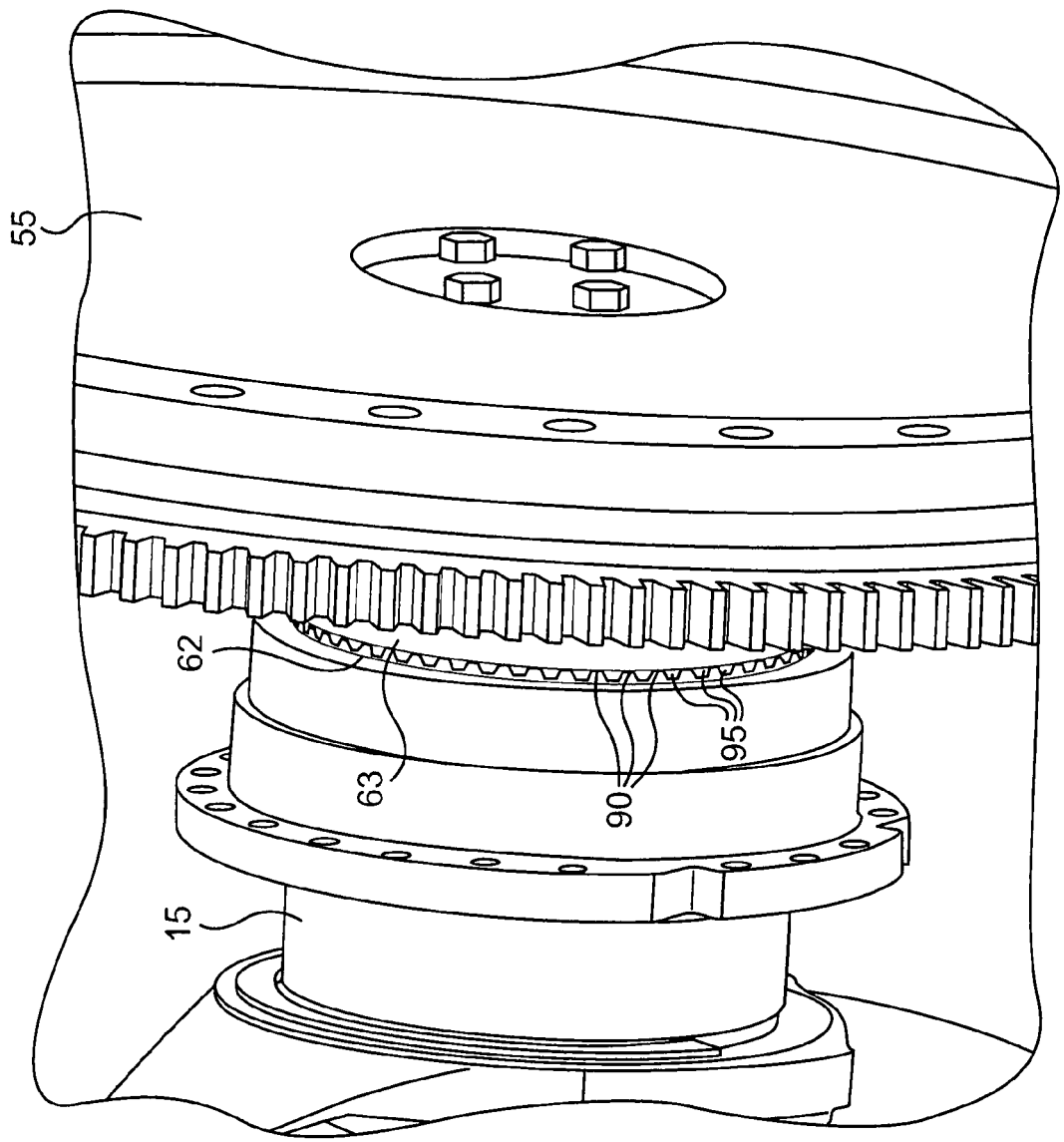
FIG. 2 is a pictorial illustration of an exemplary disclosed connection between the crankshaft of FIG. 1 and an exemplary disclosed flywheel.

Threaded fasteners 65 may include heads 67 and threaded portions 68. Crankshaft end 62 may include threaded bores 80 configured to receive threaded portions 68 of threaded fasteners 65. And, flywheel 55 may include flywheel bores 85 alignable with threaded bores 80 and configured to allow passage though flywheel 55 of threaded portions 68. Threaded bores 80 may be formed into crankshaft end 62 without passing through crankshaft 15, while flywheel bores 85 may be free of threads and may extend through flywheel 55. Although FIG. 1 illustrates generator set 10 as having multiple threaded fasteners 65, threaded bores 80, and flywheel bores 85, it is contemplated that generator set 10 may, in some embodiments, include only one threaded fastener 65, threaded bore 80, and flywheel bore 85. Regardless of how many threaded fasteners 65, threaded bores 80, and flywheel bores 85 generator set 10 includes, crankshaft end 62 may be connected to flywheel end 63 by aligning flywheel bores 85 with threaded bores 80, and then screwing threaded fasteners 65 through flywheel bores 85 into threaded bores 80 until heads 67 of threaded fasteners 65 contact flywheel 55 either directly or indirectly. Threaded fasteners 65 may then maintain in a meshed configuration the teeth protruding from each of crankshaft end 62 and flywheel end 63, as illustrated in FIG. 2.

Figure 3:
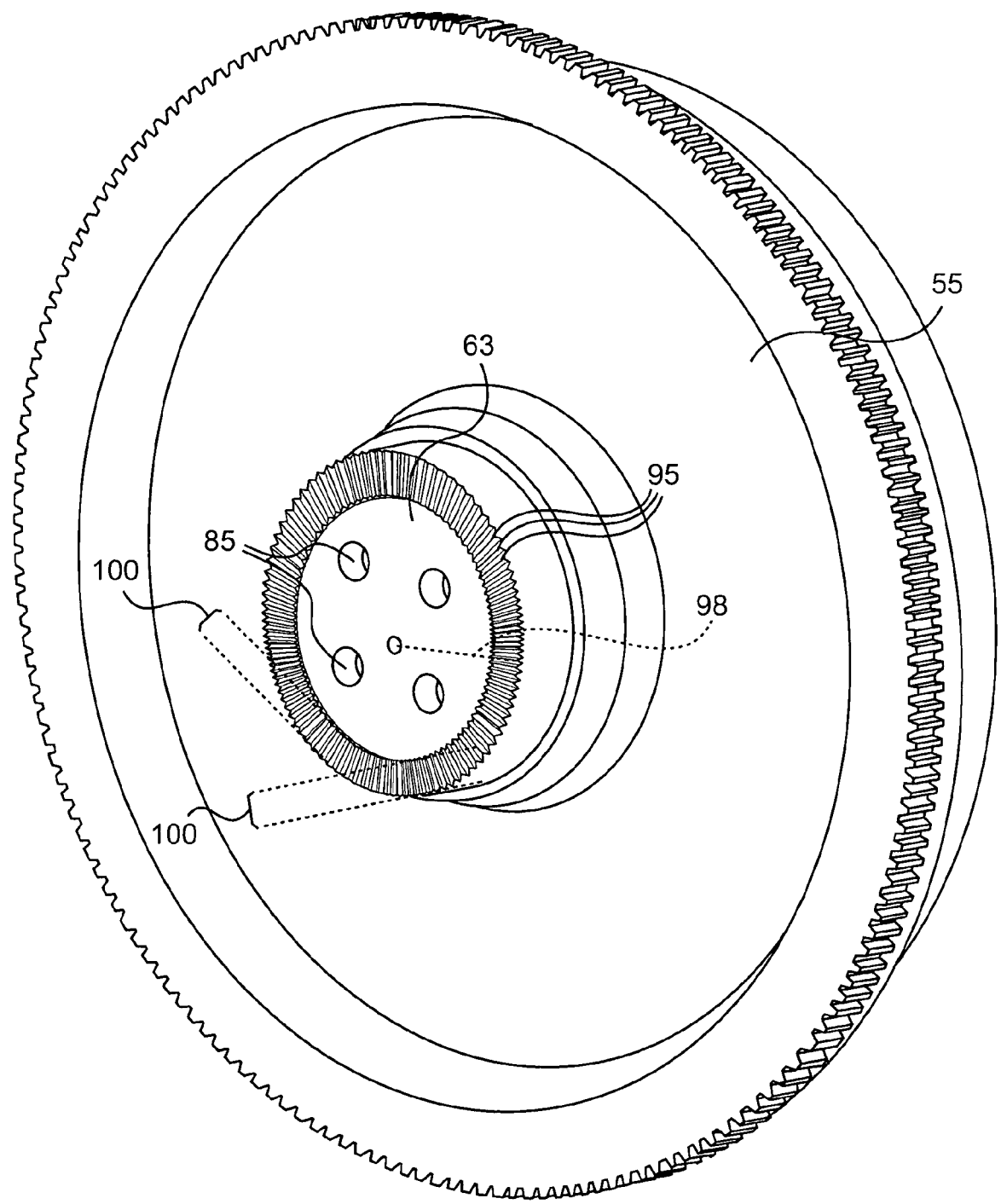
FIG. 3 is a pictorial illustration of the flywheel of FIG. 2 showing exemplary disclosed flywheel teeth.
Figure 4:
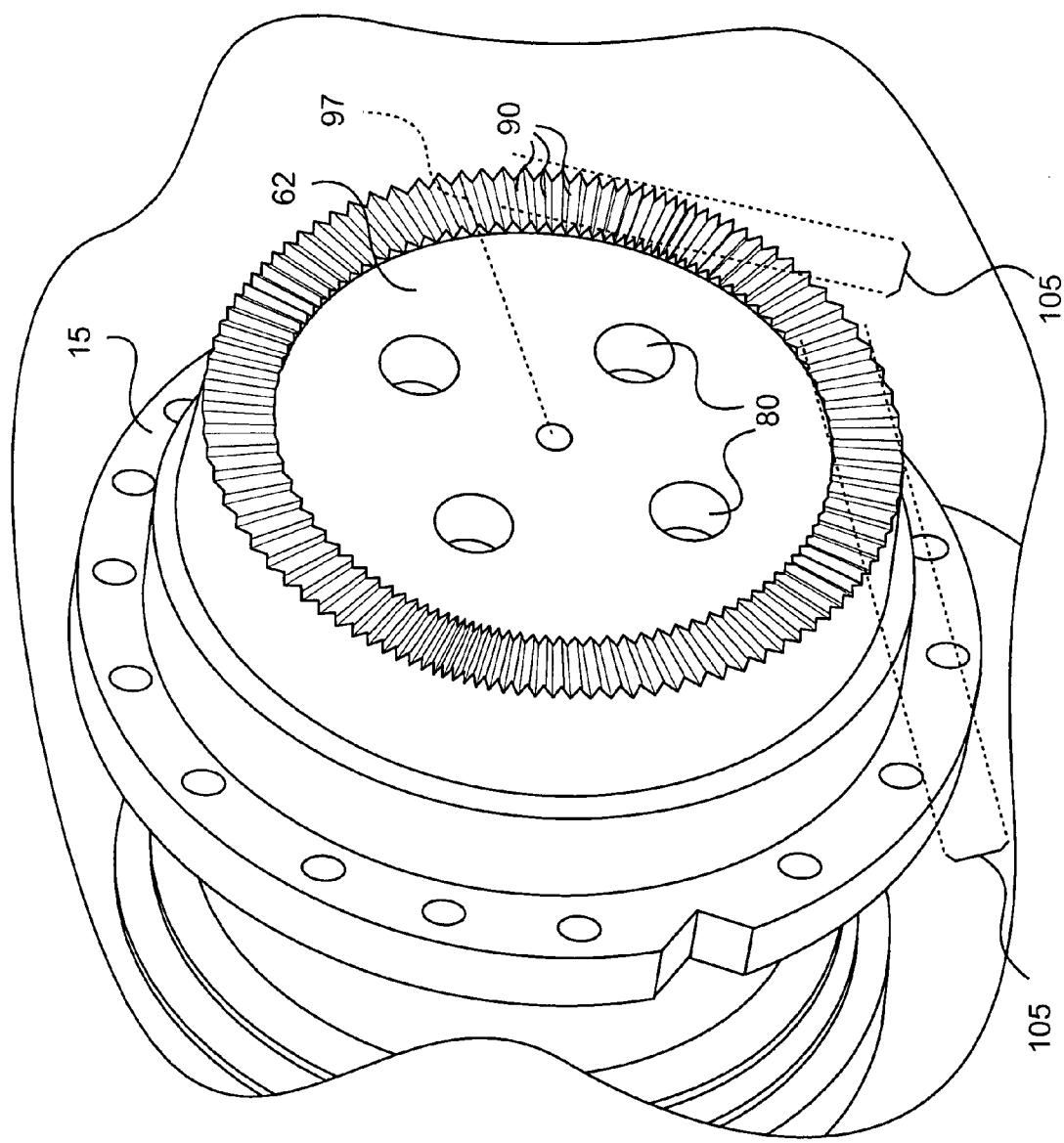
FIG. 4 is a pictorial illustration of the crankshaft of FIGS. 1-2 showing exemplary disclosed crankshaft teeth.

The teeth protruding from each of crankshaft end 62 and flywheel end 63 may be, respectively, crankshaft teeth 90 and flywheel teeth 95. Although crankshaft teeth 90 and flywheel teeth 95 may have varied shapes, it is contemplated that they may be configured to mesh with each other. For example, this meshing of crankshaft teeth 90 and flywheel teeth 95 may form a hirth-type, a curvic-type, or another type of face gear coupling known in the art, which may allow transmissions of torque from crankshaft 15 to flywheel 55 and/or from flywheel 55 to crankshaft 15. A hirth-type coupling may be formed when crankshaft teeth 90 and flywheel teeth 95 are triangularly shaped. For example, each of crankshaft teeth 90 may include a triangularly shaped protrusion of crankshaft end 62, which may extend along a radius of crankshaft 15 (e.g., a crankshaft radius 97, illustrated in FIG. 4), tapering toward a central axis of crankshaft 15. In other words, a size of the triangularly shaped protrusion of crankshaft end 62 may vary along the radius of crankshaft 15. Similarly, each of flywheel teeth 95 may include a triangularly shaped protrusion of flywheel end 63, which may extend along a radius of flywheel 55 (e.g., a flywheel radius 98, illustrated in FIG. 3), tapering toward a central axis of flywheel 55. In other words, a size of the triangularly shaped protrusion of flywheel end 63 may vary along the radius of flywheel 55. A curvic-type coupling may be formed when crankshaft teeth 90 and flywheel teeth 95 are convexly shaped. In other words, each of crankshaft teeth 90 may alternatively include a convexly shaped protrusion of crankshaft end 62. For example, the convexly shaped protrusion of crankshaft end 62 may be a conically shaped protrusion, which may have an apex positioned on the central axis of crankshaft 15. Similarly, each of flywheel teeth 95 may alternatively include a convexly shaped protrusion of flywheel end 63. For example, the convexly shaped protrusion of flywheel end 63 may be a conically shaped protrusion, which may have an apex positioned on the central axis of flywheel 55.

Regardless of the type of face gear coupling formed by the meshing of crankshaft teeth 90 and flywheel teeth 95, flywheel teeth 95 may extend from an exterior edge of flywheel end 63 along radii of flywheel 55 (e.g., flywheel radius 98) all the way to the central axis of flywheel 55. Alternatively, flywheel teeth 95 may not extend all the way to the central axis of flywheel 55. Instead, flywheel teeth 95 may form an annular portion 100 on flywheel end 63, illustrated in FIG. 3. In other words, flywheel teeth 95 may extend from the exterior edge of flywheel end 63 along radii of flywheel 55 only part of the way to the central axis of flywheel 55. In such an embodiment, flywheel bores 85 may be situated radially inward of annular portion 100, and machining costs may be reduced. Similarly, crankshaft teeth 90 may extend from an exterior edge of crankshaft end 62 along radii of crankshaft 15 (e.g., crankshaft radius 97) all the way to the central axis of crankshaft 15. Alternatively, crankshaft teeth 90 may not extend all the way to the central axis of crankshaft 15. Instead, crankshaft teeth 90 may form an annular portion 105 on crankshaft end 62, illustrated in FIG. 4. In other words, crankshaft teeth 90 may extend from the exterior edge of crankshaft end 62 along radii of crankshaft 15 only part of the way to the central axis of crankshaft 15. In such an embodiment, threaded bores 80 may be situated radially inward of annular portion 105, and machining costs may be reduced.

Industrial Applicability

The disclosed combinations may be applicable to masses. The combinations may be particularly beneficial when applied to rotatable masses, which are inadequately supported by other components. The combinations may support and rotatably drive the masses. For example, the combinations may support and rotatably drive rotors of single bearing generators.

During operation of generator set 10 (referring to FIG. 1), rotor 20 may orbit and/or vibrate as it rotates to produce electricity. Additionally, crankshaft 15 may orbit and/or vibrate as it rotates. It is contemplated that the orbiting and/or vibrating of rotor 20 and/or crankshaft 15 may cause crankshaft end 62 and/or flywheel end 63 to orbit and/or vibrate. But, bearing 52 may reduce or prevent the orbiting and/or vibrating of crankshaft end 62, flywheel end 63, and/or rotor 20, thereby reducing bending movement of crankshaft 15. Reducing this bending movement may prevent premature failure of crankshaft 15, thus reducing maintenance costs associated with generator set 10.

It is also contemplated that crankshaft 15 may transfer large amounts of torque to and rotatably drive rotor 20 at high speeds. The chain of connections between crankshaft 15 and rotor 20, and more specifically, the connection between crankshaft 15 and flywheel 55 may be configured such that the large amounts of torque and high rotational speeds do not damage bearing 52. In particular, the connection may be configured such that flywheel end 63 may have a diameter sufficiently small to prevent the high rotational speeds from generating excessive surface speeds of flywheel end 63, which may damage bearing 52. Specifically, the connection may allow crankshaft 15 to transfer large amounts of torque to rotor 20 via crankshaft teeth 90 and flywheel teeth 95. These teeth may eliminate or reduce an amount of torque transferred via threaded fasteners 65, and thereby alter a primary function of threaded fasteners 65. Instead of directly transferring torque between crankshaft 15 and flywheel 55, threaded fasteners 65 may indirectly transfer torque between crankshaft 15 and flywheel 55 by maintaining in a meshed configuration crankshaft teeth 90 and flywheel teeth 95.

It will be apparent to those skilled in the art that various modifications and variations can be made to the combinations of the present disclosure. Other embodiments of the combinations will be apparent to those skilled in the art from consideration of the specification and practice of the combinations disclosed herein. It is intended that the specification and examples be considered as exemplary only, with a true scope of the disclosure being indicated by the following claims and their equivalents.

What is claimed is:

1. A combination for use in supporting and rotatably driving a mass, the combination comprising:
   a power source;
   a flywheel configured to connect with and rotatably drive the mass, the flywheel including a flywheel end having a plurality of flywheel protrusions;
   a bearing situated at least partially within the power source, wherein the bearing is configured to support and at least partially house the flywheel; and
   a crankshaft shaped to connect with and rotatably drive the flywheel, the crankshaft including a crankshaft end having a plurality of crankshaft protrusions, wherein the plurality of crankshaft protrusions are shaped to mesh with the plurality of flywheel protrusions.

2. The combination of claim 1, wherein both the plurality of flywheel protrusions and the plurality of crankshaft protrusions are triangularly shaped.

3. The combination of claim 1, wherein both the plurality of flywheel protrusions and the plurality of crankshaft protrusions are convexly shaped.

4. The combination of claim 1, wherein:
   the plurality of flywheel protrusions form an annular portion on the flywheel end; and
   the plurality of crankshaft protrusions form an annular portion on the crankshaft end.

5. The combination of claim 4, further including at least one threaded fastener, wherein:
   the crankshaft includes at least one threaded bore configured to receive the at least one threaded fastener, the at least one threaded bore being formed into the crankshaft end and situated radially inward of the annular portion on the crankshaft end; and
   the flywheel includes at least one flywheel bore, the at least one flywheel bore extending through the flywheel and being alignable with the at least one threaded bore.

6. The combination of claim 1, further including at least one threaded fastener, wherein:
   the crankshaft includes at least one threaded bore configured to receive the at least one threaded fastener, the at least one threaded bore being formed into the crankshaft end; and
   the flywheel includes at least one flywheel bore, the at least one flywheel bore extending through the flywheel and being alignable with the at least one threaded bore.

7. The combination of claim 1, wherein the bearing includes a journal bearing.

8. The combination of claim 1, wherein the mass includes a rotor of a single bearing generator.

9. A combination for use in supporting and rotatably driving a rotor of a single bearing generator, the combination comprising:
   a power source;
   a flywheel configured to connect with and rotatably drive the rotor, the flywheel including a plurality of flywheel teeth;
   a bearing situated at least partially within the power source, wherein the bearing is configured to support and at least partially house the flywheel; and
   a crankshaft configured to connect with and rotatably drive the flywheel, the crankshaft including a plurality of crankshaft teeth, wherein the plurality of crankshaft teeth are configured to mesh with the plurality of flywheel teeth.

10. The combination of claim 9, wherein both the plurality of flywheel teeth and the plurality of crankshaft teeth are configured such that a hirth-type coupling is formed by meshing the plurality of flywheel teeth with the plurality of crankshaft teeth.

11. The combination of claim 9, wherein both the plurality of flywheel teeth and the plurality of crankshaft teeth are configured such that a curvic-type coupling is formed by meshing the plurality of flywheel teeth with the plurality of crankshaft teeth.

12. The combination of claim 9, wherein:
the plurality of flywheel teeth form an annular portion on a flywheel end of the flywheel; and
the plurality of crankshaft teeth form an annular portion on a crankshaft end of the crankshaft.

13. The combination of claim 12, further including at least one threaded fastener, wherein:
the crankshaft includes at least one threaded bore configured to receive the at least one threaded fastener, the at least one threaded bore being situated radially inward of the annular portion on the crankshaft end; and
the flywheel includes at least one flywheel bore, the at least one flywheel bore extending through the flywheel and being alignable with the at least one threaded bore.

14. The combination of claim 9, further including at least one threaded fastener, wherein:
the crankshaft includes at least one threaded bore configured to receive the at least one threaded fastener; and
the flywheel includes at least one flywheel bore, the at least one flywheel bore extending through the flywheel and being alignable with the at least one threaded bore.

15. The combination of claim 9, wherein the bearing includes a journal bearing.

16. A generator set, comprising:
a single bearing generator having a rotor;
a power source;
a flywheel configured to connect with and rotatably drive the rotor, the flywheel including:
a flywheel end; and
a plurality of flywheel teeth protruding from the flywheel end;
a bearing situated at least partially within the power source, wherein the bearing is configured to support and at least partially house the flywheel; and
a crankshaft configured to connect with and rotatably drive the flywheel, the crankshaft including:
a crankshaft end; and
a plurality of crankshaft teeth protruding from the crankshaft end, wherein both the plurality of flywheel teeth and the plurality of crankshaft teeth are configured such that a curvic-type coupling is formed by meshing the plurality of flywheel teeth with the plurality of crankshaft teeth.

17. The generator set of claim 16, wherein:
the plurality of flywheel teeth form an annular portion on the flywheel end; and
the plurality of crankshaft teeth form an annular portion on the crankshaft end.

18. The generator set of claim 17, further including at least one threaded fastener, wherein:
the crankshaft includes at least one threaded bore configured to receive the at least one threaded fastener, the at least one threaded bore being formed into the crankshaft end and situated radially inward of the annular portion on the crankshaft end; and
the flywheel includes at least one flywheel bore, the at least one flywheel bore extending through the flywheel and being alignable with the at least one threaded bore.

19. The generator set of claim 16, further including at least one threaded fastener, wherein:
the crankshaft includes at least one threaded bore configured to receive the at least one threaded fastener, the at least one threaded bore being formed into the crankshaft end; and
the flywheel includes at least one flywheel bore, the at least one flywheel bore extending through the flywheel and being alignable with the at least one threaded bore.

20. The generator set of claim 16, wherein the bearing includes a journal bearing.

* * * * *

UNITED STATES PATENT AND TRADEMARK OFFICE
CERTIFICATE OF CORRECTION

PATENT NO. : 8,307,801 B2  
APPLICATION NO. : 12/285218  
DATED : November 13, 2012  
INVENTOR(S) : Oilar et al.

It is certified that error appears in the above-identified patent and that said Letters Patent is hereby corrected as shown below:

In the Specification

Column 5, line 19, delete "Industrial Applicability" and insert -- INDUSTRIAL APPLICABILITY --.

Signed and Sealed this  
Eleventh Day of August, 2015

Michelle K. Lee  
*Director of the United States Patent and Trademark Office*